(No Model.)
H. OGBORN.
CASTER.
No. 273,298. Patented Mar. 6, 1883.
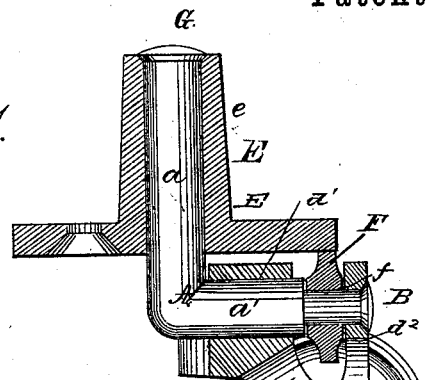
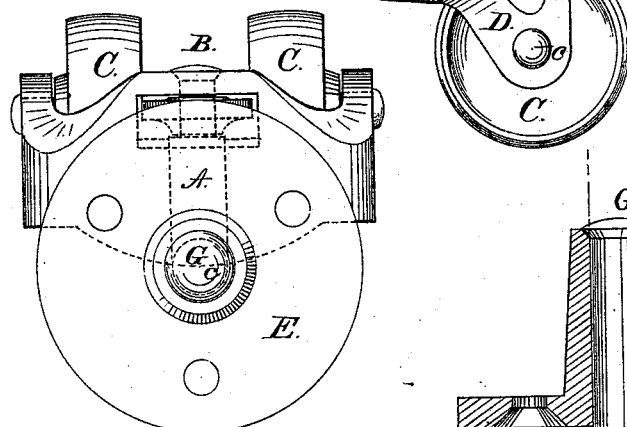
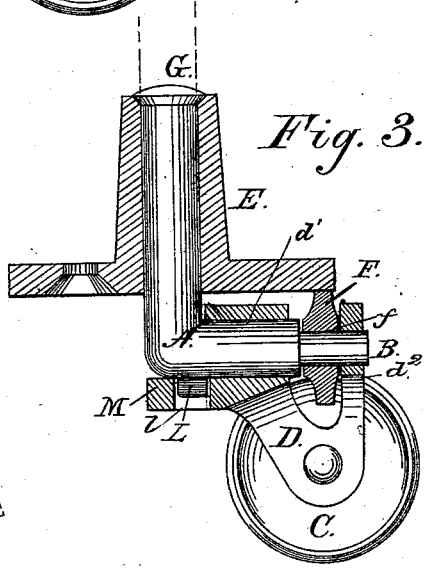
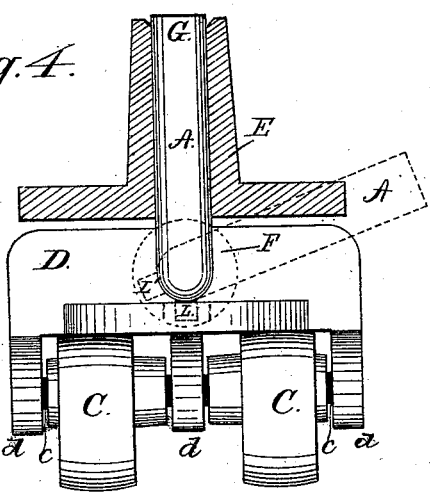
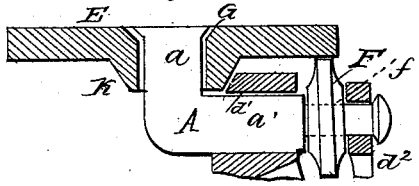
Witnesses.
J. G. Hinkel
Geo Binkenburg
Inventor
Harrison Ogborn.
By DeWitt C. Allen
Attorney.

UNITED STATES PATENT OFFICE.

HARRISON OGBORN, OF RICHMOND, INDIANA, ASSIGNOR TO THE RICHMOND CASTER COMPANY, OF SAME PLACE.

CASTER.

SPECIFICATION forming part of Letters Patent No. 273,298, dated March 6, 1883.

Application filed September 28, 1882. (No model.)

*To all whom it may concern:*

Be it known that I, HARRISON OGBORN, a citizen of the United States, residing at Richmond, in the county of Wayne and State of Indiana, have invented certain new and useful Improvements in Casters; and I do hereby declare the following to be a full, clear, and exact description of the invention, such as will enable others skilled in the art to which it appertains to make and use the same.

My invention relates to certain new and useful improvements in casters, and has for its object the production of a caster combining simplicity in its construction and effectiveness in operation; and to this end the invention consists in novel features of construction and combination and arrangement of parts, all as will be hereinafter fully described, and set forth in the claims hereto annexed.

Referring to the accompanying drawings, Figure 1 represents a vertical section through my improved caster; Fig. 2, a top view or plan of the same, showing in curved dotted lines the rear portion of the caster-saddle; Fig. 3, a vertical section through caster, showing a device for locking the parts thereof together; Fig. 4, a vertical section through caster plate and sheath and rear view of caster-saddle and floor-wheels, showing in dotted lines the anti-friction wheel and locking device; Fig. 5, a vertical section similar to Fig. 1, whereby the sheath for caster-stem is dispensed with.

In the drawings, C C represent the floor-wheels of the caster, loosely mounted upon a shaft, c, passing through the downwardly-projecting portions d of the caster-saddle D. This caster-saddle D has a central and transverse horizontal opening, $d'$, through it for the reception of the horizontal portion a of the elbow or bent stem A, adapted to oscillate therein for permitting free lateral movement of the caster, the vertical portion $a'$ of said stem passing up through caster-plate E and sheath e, cast or formed integral therewith.

The forward end of the horizontal portion a of caster-stem is reduced in diameter, and has loosely mounted thereon the anti-friction wheel F, which projects up through an opening, $f$, in caster-saddle, and runs near the outer edge and on the under side of caster-plate E, whereby the weight above is supported and the caster-stem relieved from friction, thus allowing the caster free play in all directions.

The horizontal portion of the caster-stem is adapted to oscillate in its bearings, thus permitting free lateral movement of the caster, and said stem is swaged or riveted in the usual manner at its ends to secure it in position.

All of the parts of the caster being properly made, the horizontal portion $a'$ of the bent caster-stem A is passed into the horizontal opening $d'$ in caster-saddle D, through the anti-friction wheel F, when placed in position, and thence through and outside of the wall $d^2$ of said saddle in rear of the anti-friction wheel, where it is securely riveted or swaged to hold it in position and prevent its being drawn out. The caster-plate and sheath are then placed over the vertical portion a of the bent caster-stem and securely riveted or swaged thereto, all as clearly shown in Fig. 1.

If it is desired to make a flat top caster-plate, an annular rim, K, is cast on the under side thereof, the sheath omitted, and the vertical portion a of caster-stem made shorter, so as to be only long enough to rivet down into a countersink in the top of the caster-plate, all as clearly shown in Fig. 5.

When the caster is to be used on bedsteads and other furniture, and it is desired to have the caster drop out when the furniture is lifted up, the caster-plate is made with the sheath, and the vertical portion a of the caster-stem made long enough to project some distance above the top of sheath, and not riveted at the top, as shown in dotted lines, Fig. 3.

In constructing my improved caster a locking device may also be made in connection therewith, and which is composed of a lug, L, secured to the under side of the horizontal portion $a'$ of the caster-stem, near its bend, which is adapted to fit in an opening, $l$, of suitable size through the caster-saddle, to permit of the necessary lateral play of the caster, but still retain the lug in place when the parts are placed in their relative positions, and the vertical portion of the caster-stem swaged or riveted at its upper end in the sheath or mortise G of the caster-plate. The horizontal portion of the stem may be further secured by being riveted at the end.

When the locking device is used in putting the parts together, the stem A is turned to one side, so that it and the lug L will occupy the position shown in dotted lines, Fig. 4, when the stem is turned upward, and the caster-plate and sheath put in position on the vertical portion $a$ of the stem, which is then riveted or swaged at its upper end, thus securely locking the caster-stem in position.

The caster-stem is always bent at or nearly at right angles, and is usually made of wrought or malleable iron or other suitable material, to prevent breakage and to permit of riveting, and it is always made integral.

The foregoing-described construction of casters, while being simple and cheap, is strong and durable, and adapted to be applied to all kinds of furniture—light and heavy—and to floor-trucks, machinery, and musical instruments.

It will be observed by the use of the elbow or bent stem I am enabled to dispense with or cut away all that portion of caster-saddle in front of stem, thus leaving the caster-saddle all in rear of the stem, thereby saving considerable metal in the construction of the casters.

Having thus fully described my invention, what I claim as new, and desire to secure by Letters Patent, is—

1. The elbow or bent caster-stem A, riveted or otherwise secured to the caster, in combination with caster-plate E and oscillating caster-saddle D, having a horizontal opening, $d'$, therein, in which the horizontal portion $a'$ of the caster-stem is adapted to oscillate, substantially as set forth and described.

2. The elbow or bent caster-stem A, in combination with caster-plate E, oscillating caster-saddle D, and an anti-friction wheel, F, constructed and operated substantially as set forth.

3. In a caster, the combination of the bent or crooked caster-stem A, riveted at its outer horizontal end, and provided with anti-friction wheel F, the caster-plate E, having a vertical central opening for the reception of the vertical portion of caster-stem, and caster-saddle D, having a horizontal opening for the reception of the horizontal portion of caster-stem, and the floor-wheels C C, substantially as herein set forth.

4. The elbow or bent caster-stem A, provided with the locking-lug L, in combination with the caster-saddle D, having an opening, $l$, through it, substantially as and for the purpose herein shown and described.

In testimony whereof I affix my signature in presence of two witnesses.

HARRISON OGBORN.

Witnesses:
JAMES W. HENDERSON,
WILLIAM H. OGBORN.